Figure 2:
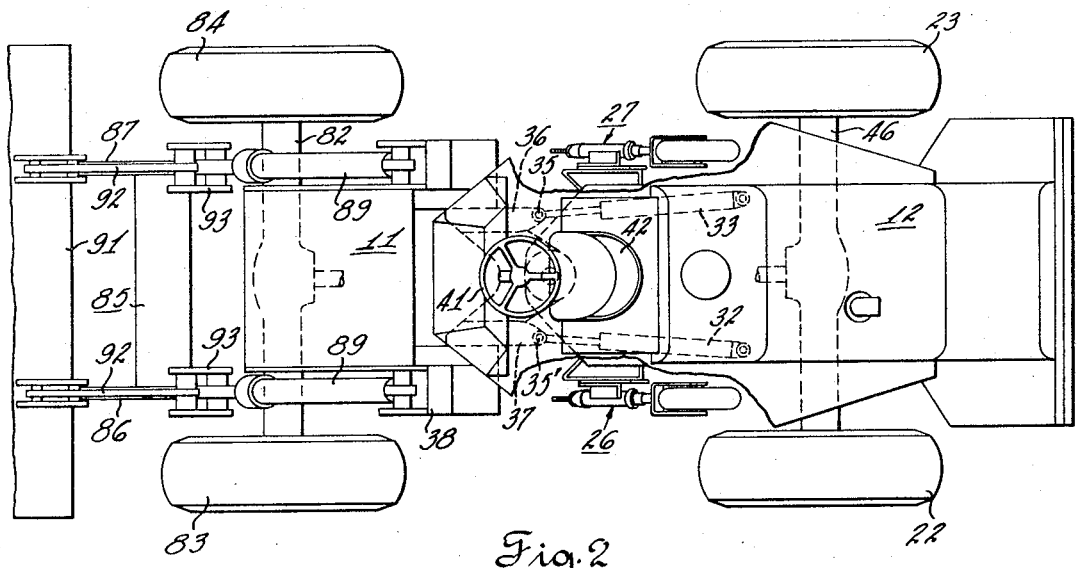

June 20, 1967  P. O. BULLER  3,326,312
VEHICLE WITH AUXILIARY STEERABLE WHEELS
Filed Aug. 4, 1965  3 Sheets-Sheet 1

Inventor
Paul O. Buller
By Charles E. Schurr
Attorney

June 20, 1967  P. O. BULLER  3,326,312
VEHICLE WITH AUXILIARY STEERABLE WHEELS
Filed Aug. 4, 1965  3 Sheets-Sheet 2
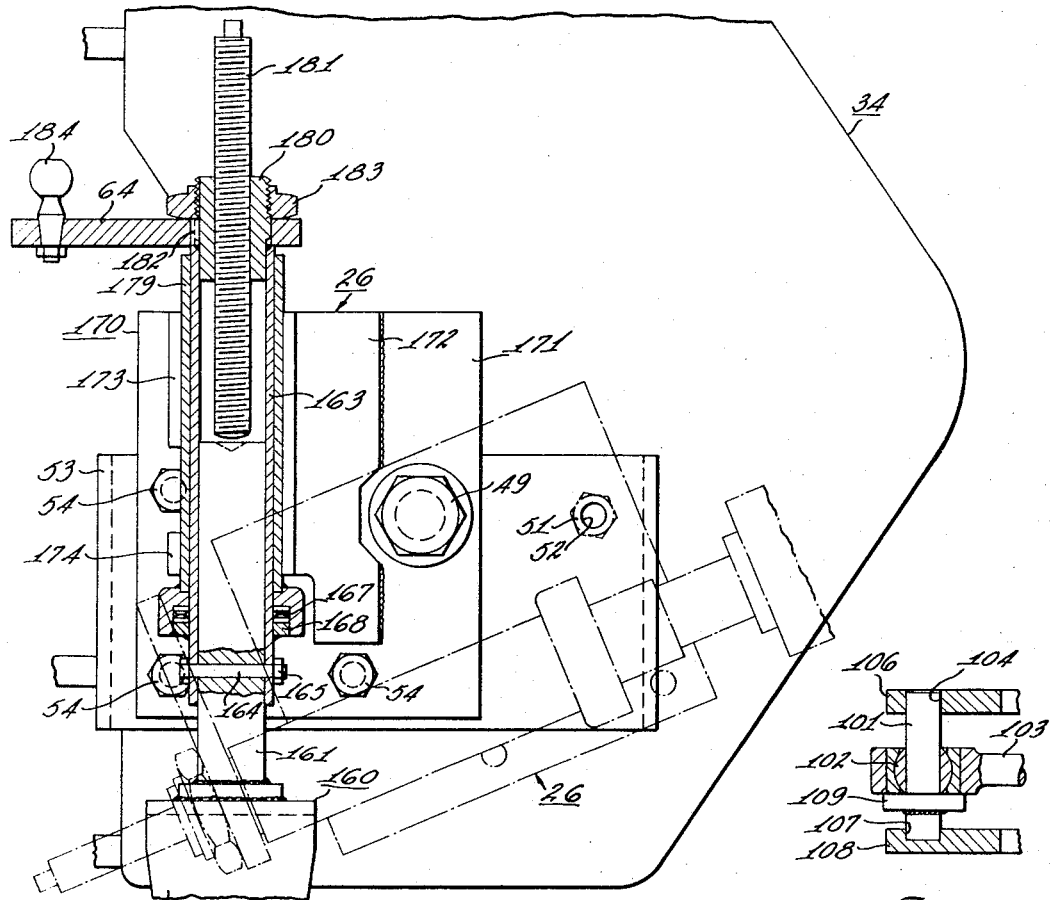
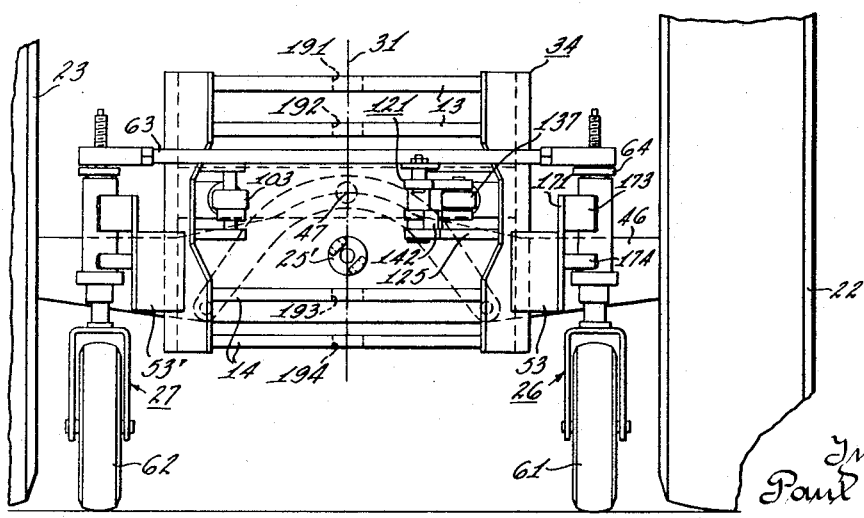
Inventor
Paul O. Buller
By Charles T. Schmidt
Attorney

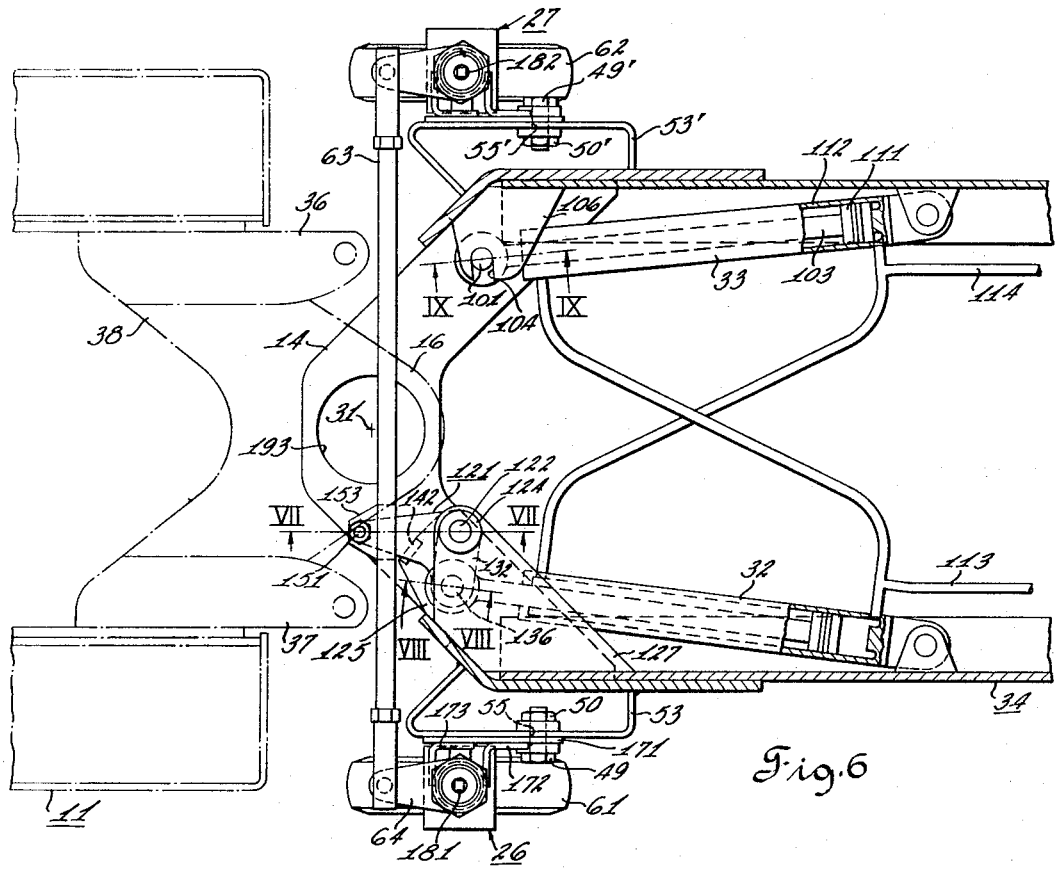

United States Patent Office 3,326,312
Patented June 20, 1967

3,326,312
VEHICLE WITH AUXILIARY STEERABLE WHEELS
Paul O. Buller, Highland Park, Ill., assignor to Allis-Chalmers Manufacturing Company, Milwaukee, Wis.
Filed Aug. 4, 1965, Ser. No. 477,092
13 Claims. (Cl. 180—14)

This invention relates to providing a vehicle with auxiliary steerable wheels and particularly to retractable auxiliary steerable wheels which convert an otherwise unstable two wheel tractor to a steerable self-propelled vehicle.

Articulated vehicles presently on the market have a power module which is releasably connected by a vertical hitch pin arrangement to a wheeled tool module or other wheeled unit. The power module is essentially a two wheel tractor with an engine and operator's station. The wheeled module may be a front end loader, a wheeled hitch for a trailing vehicle such as an earthmover or scraper, a fork lift, crane or compacting roller. When the tool and power modules are disconnected from one another the power module is unstable and jacks, cranes and/or other devices may be needed to bring the two modules into proper relation relative to one another to permit their being interconnected. I conceived of temporarily converting the power module to a self-propelled steerable vehicle by the provision of auxiliary wheeled support structures which are connectable to the power steering means on the power module. The resulting self-propelled, steerable vehicle can be driven to the tool module for connection thereto.

It is an object of this invention to provide auxiliary wheel supports for an articulated vehicle which permit an otherwise unstable power module of an articulated vehicle to be converted to a self-propelled, steerable vehicle.

It is a further object of this invention to provide detachable auxiliary wheel support means for an unstable two wheeled power module which will temporarily convert it to a stable vehicle to facilitate its travel on land.

It is a further object of this invention to provide auxiliary steerable wheeled support means for the two wheel power section of an articulated vehicle having a power steering motor and operator's station, which are connectable to the power steering motor for steering operation thereof.

It is a further object of this invention to provide a pair of adjustable auxiliary wheel structures on the two wheeled power section of an articulated vehicle which when lowered to a vehicle supporting position are adjustable to permit accurate alignment of the pivot members of the two sections of the articulated vehicle.

It is a further object of this invention to provide auxiliary wheel support means as hereinbefore outlined wherein the extensible and contractible steering jack provided on the power module for articulatively steering the articulated vehicle may be connected to the auxiliary wheels to steer them.

It is a further object of this invention to provide auxiliary steerable wheels as outlined in the previous paragraph, wherein means are provided on the power module to inactivate one of two steering jacks and means are provided to connect the other steering jack to the auxiliary wheels to effect steering thereof.

It is a further object of this invention to provide an auxiliary vehicle support means for a two wheel tractor section of an articulated vehicle which may be quickly connected to and disconnected from the vehicle steering mechanism.

It is a further object of this invention to provide structure as outlined in the previous object which includes steering conversion brackets which do not interfere with normal steering of the articulated vehicle.

Figure 1:
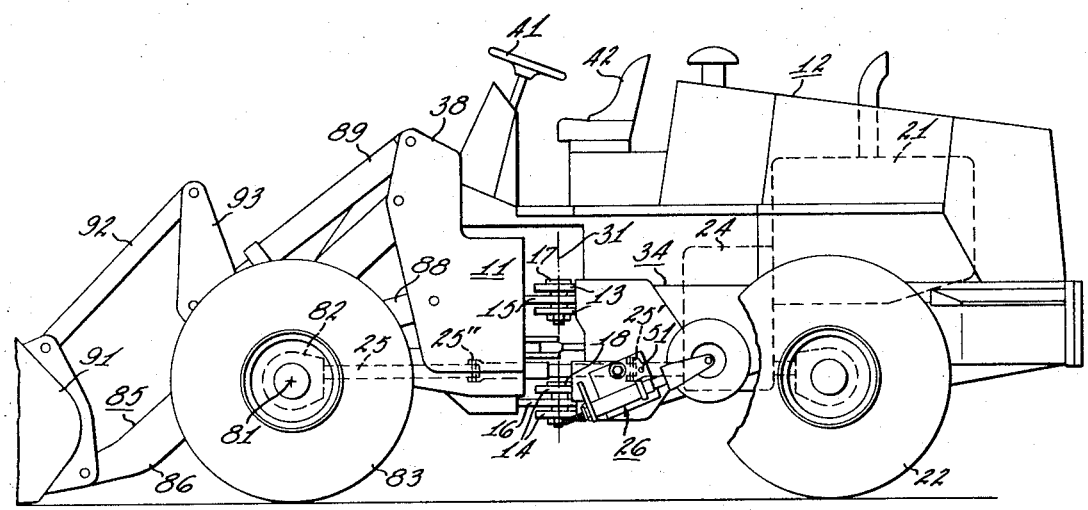

These and other objects and advantages of this invention will be apparent to those familiar with the art when the following description is read in conjunction with the drawings in which:

FIG. 1 is a side view of an articulated vehicle in which my invention is incorporated;
FIG. 2 is a top view of the vehicle shown in FIG. 1;
FIG. 3 is an enlarged side view showing details of an auxiliary wheel structure;
FIG. 4 is a front view of a portion of the power module of the articulated vehicle shown in FIG. 1 with the two wheeled front section removed therefrom and the auxiliary wheels lowered to support the power module;
FIG. 5 is a side view of the structure shown in FIG. 4;
FIG. 6 is a top view of the structure shown in FIG. 5;
FIG. 7 is a section view taken on the line VII—VII in FIG. 6;
FIG. 8 is a section view taken on the line VIII—VIII in FIG. 6; and
FIG. 9 is a section view taken on the line IX—IX in FIG. 6.

Description of articulated loader

Referring to FIGS. 1 and 2, the articulated tractor loader has a front module or section 11 with shovel attachment having a two wheeled fixed axle and a rear power module or section 12 having a two wheeled oscillating axle 46. The modules 11 and 12 are connected for relative articulating steering movement about a vertical pivot axis 31 by pivot pins 17, 18 interconnecting hitch brackets 13, 14, 15, 16. This hitch construction is more fully illustrated and described in copending U.S. patent application Ser. No. 420,890, Pivot Construction, filed Dec. 24, 1964. The power module 12 is an unstable two wheel tractor having an engine 21 connected to drive wheels 22, 23 through a drive train which includes a transmission 24. The front wheels 83, 84 are also engine driven through a power shaft 25 interconnecting the front drive axle 82 and the transmission 24. Suitable universal joints 25' and 25" are provided in the drive shaft to facilitate articulating movement of the vehicle sections 11, 12. The center of gravity of the power module 12 is forwardly of the drive wheels 22, 23 and due to the weight of the shovel 91 and its linkage components the center of gravity of the tool module 11 is forward of the axis 81 of wheels 83, 84. The shovel or bucket 91 is pivotally connected to booms 86, 87 of boom structure 85 which at their rear ends are pivotally connected to frame 38. The boom structure is raised and lowered by a pair of jacks 88, only one of which is shown. Bucket tilting is effected through links 92, levers 93 and jacks 89. Steering of the articulated vehicle is effected by power steering means including a pair of double acting fluid motors in the form of hydraulic jacks 32, 33 pivotally connected at their rear ends to the main frame 34 of the power module 12 and having their rod ends pivotally connected by pins 35, 35' to arms 36, 37 on the frame 38 of the tool module 11. The double acting hydraulic steering motors 32, 33 are hydraulically cross connected as illustrated in FIG. 6, so that when jack 32 is retracted, jack 33 is expanded and vice versa. The expansion and contraction of the hydraulic steering jacks 32, 33 is controlled through a conventional steering control valve, not illustrated, which in turn is controlled by steering wheel 41 at the operator's station 42. The drive axle 46, mounting drive wheels 22, 23 at its opposite transverse ends, is pivotally connected on longitudinal axis 47 to the elongated frame 34 of the power module 12, thus permitting limited oscillation of the axle 46 relative to the frame 34 to insure traction and stability of the tractor loader vehicle when traversing uneven terrain. The connection of the rear drive axle 46 to the main frame 34 is shown and described in greater detail in copending U.S. patent application Ser. No. 454,904, Battery Compartment, filed May 11, 1965.

On occasion it may be desired to disconnect the loader module 11 from the power module 12 to transport the modules separately or to change front end modules. This is achieved by removing pivot pins 17, 18, steering jack connecting pins 35, 35', disconnecting drive shaft 25 and uncoupling the hydraulic lines between the rear module and front module.

*Description of auxiliary wheel mechanism*

Heretofore a variety of devices have been employed to support and position two wheel tractors when disconnected from towed or pushed vehicular units. I conceived of providing auxiliary wheel structures 26, 27 which are adjustable between a retracted transport position in which shown in FIGS. 1 and 2 and a lowered vehicle supporting position shown in FIGS. 4, 5 and 6 and means for connecting the steerable wheels 61, 62 of the support structures 26, 27 to one of the steering jacks 32, 33. This temporarily converts the otherwise unstable two wheel power module 12 into a stable, self-propelled vehicle which is steerable through operation of the manual steering control (steering wheel 41). The aspect of converting the rear power module 12 into a self-propelled, steerable unit is particularly desirable in situations where cranes, lifts or other suitable materials handling equipment are not available to support and maneuver the front and/or rear modules into position for connection to one another. My invention is particularly advantageous in instances where the front and rear sections are individually lowered into otherwise inaccessible areas by helicopter, which may be necessary because of the load capacity limitation of the available helicopter.

In order to facilitate mounting the auxiliary wheel structures on the front end of the power module 12, mounting pads 53, 53' are welded to transversely opposed sides of the front end of frame 34. Suitable transverse holes 55, 55' are formed in the formed plate pads 53, 53' for receiving bolts 49, 49', which together with nuts 50, 50' and suitable washers, pivotally secure auxiliary wheel structures 26, 27 to the frame 34.

The construction of auxiliary wheel structure 26 will now be described and it should be understood that auxiliary wheel structure 27 is a reverse image thereof with some components being identical. Referring to FIGS. 3 through 6, the auxiliary wheel structure 26 includes a support housing 170 which is fabricated by welding brackets 172, 173, 174 to a pivot plate 171 and to a hollow cylinder 179. Auxiliary wheel structure 26 also includes a steerable wheel assembly 160 which includes an adjustable spindle having a fork with an upright solid cylinder portion 161 welded to a yoke portion 162 pivotally mounting wheel 61 and an upper sleeve 163 to which the fork is secured by bolt 164 and nut 166. The upper part or sleeve 163 of the spindle has a reduced diameter portion 180 welded thereto which is internally threaded to receive an adjusting screw 181 and to which a steering arm 64 is nonrotatably secured by a key 182 and lock nut 183. When the bolt 164 is removed the wheel 61 and its mounting fork are vertically adjustable by operation of adjusting screw 181 which is squared at its upper end to receive a suitable wrench. A pivot ball 184 is secured to the end of steering arm 64 and is suitable for releasable connection to a tie rod 63 as shown in FIGS. 4, 5 and 6. Releasable tie rod connections are well known in the art and therefore details thereof are not shown. A suitable antifriction thrust bearing 167 is installed between flange 168 on the spindle and an annular flange on hollow cylinder 179.

When it is desired to pivotally adjust auxiliary wheel structure 26 from its transport position, shown in FIGS. 1 and 2 (and in dot-dash lines in FIG. 3), to its vehicle supporting position, shown in FIGS. 4, 5 and 6, the cap screw 51 is removed from threaded hole 52 in mounting pad 53 and the auxiliary wheel support 26 is swung vertically to its upright position, about the axis of pivot bolt 49, and cap screws 54 are installed through holes in plate 171 in aligned threaded openings in mounting pad 53.

When the auxiliary wheel structures are placed in their vehicle supporting positions as illustrated in FIGS. 4, 5 and 6, and the front tool module 11 has been separated from the rear power module 12, a pin 101 is inserted through the ball pivot component 102 in the rod 103 of hydraulic jack 33 as shown in FIG. 9. The opening 104 in the upper bracket 106 in which pin 101 is inserted is elongated transversely as shown in FIGS. 6 and 9. The aligned cylindrical hole 107 in bottom bracket 108 is somewhat larger in diameter than the pin 101 to facilitate installation and removal of the pin 101. A collar 109 is welded to the pin 101 so that the weight of the hydraulic jack 33 helps to keep the pin 101 in its installed position as shown in FIG. 9. With the pin 101 installed, the piston 111 on rod 103 is bottomed in the cylinder 112 of jack 33 as shown in FIG. 6. Thus, when fluid pressure is supplied to supply hose 113, and hose 114 is connected to reservoir the retraction force exerted on piston 111 is absorbed by the cylinder 112 and no force is exerted on pin 101. When hydraulic pressure is supplied to hose 114, and hose 113 is connected to reservoir, the force exerted by the jack 33 is transmitted to brackets 106 and 108 through pin 101. To minimize the changes necessary to adapt the auxiliary support wheel structures for steering by the vehicle power steering system, the hydraulic steering jacks 32, 33 are kept in their cross connected relationship.

To complete the conversion of the power module to a self-propelled steerable vehicle, a bell crank structure 121 is installed on a pivot pin 122 which has its bottom end supported in a blind hole 123 in bracket 125 and its top end supported in an insert collar 124 having a shoulder 126 to maintain it in position on the top bracket 127. The bell crank structure 121 has an upper bell crank shaped component 128 which has a forward leg and a transversely extending leg. The transversely extending leg has an opening 129, as shown in FIG. 8, which is aligned with an opening 131 in a lower leg 132 welded to a spacer 133 which in turn is welded to bell crank component 128 and to a bottom spacer 134. A pin 136 passes through the end of rod 137 of hydraulic steering jack 32 and is secured in place by a suitable locking pin 138 passing through aligned openings in the pin 136 and bottom leg 132. An opening 139 is provided in bracket 125 so that the pin 136 can be removed downwardly therethrough upon locking pin 138 being removed. By using pinball type connections on the rods and cylinder ends of hydraulic jacks 32, 33, the pins 136 and 101 connecting the rod ends can be tilted so that they can be readily installed and removed. The collar 124 is removable to facilitate installation and removal of pin 122 and bell crank structure 121.

A stop block 142 is welded on to the lower bracket 125 for engagement by leg 132 to provide means for limiting the stroke of jack 32. A stud bolt 151 is welded to the forward end of bell crank component 128 and its upper end fits in a slotted opening 152 in a bracket 153 welded to tie rod 63. A suitable washer 154 and nut 156 are placed on the threaded end of stud 151.

Although the front tool module in the illustrated embodiment of the invention is a front end loader, it should be understood that other tool modules can be readily substituted. Among these may be modules incorporating a lift mast, a bulldozer, a roller, a crane or a hitch adapted for connection to an earthworking scraper or other trailing vehicle. In the case of use of an earthworking scraper hitch module, the operator's station on the power unit would be turned 180 degrees since such vehicle would normally be operated in the opposite direction.

Since the frame 34 of the power module 12 is pivoted to the rear power axle 46 on a longitudinal pivot axis 47, the opening 191, 192, 193, 194 of pivot components or brackets 13, 14 on the power modules can be vertically aligned with the openings of pivot components 15, 16 on the front module by adjusting the screws 181, 182 of the support structures 26, 27. Adjustment of only one of the screws 181, 182 adjusts the axis 31 of the openings 191, 192, 193, 194 in a transverse vertical plane and simultaneous adjustment of the screws 181, 182 in the same direction adjusts the axis 31 in a longitudinal vertical plane.

When it is desired to connect the power module 12 to a suitable tool module the only auxiliary items that need to be removed are the tie rod 63, pin 101, pin 122 and bell crank 121. The brackets 106, 108, mounting pin 101 and the brackets 127, 125 mounting pin 122 do not interfere with normal operation of the articulated vehicle.

The embodiments of the invention in which an exclusive property or privilege is claimed are defined as follows:

1. A vehicle module comprising:
   an elongated frame,
   a source of power mounted on said frame,
   a pair of drive wheels mounted on said frame and disposed on transversely opposite sides thereof and operatively connected in driven relation to said source of power,
   a pivot member of an articulation joint on one end of said frame having a substantially vertical pivot axis, said pivot member being adapted for articulative steering connection with a second vehicle module to provide a stable vehicle,
   an auxiliary wheeled support structure disposed in longitudinally spaced relation to said drive wheels including
      a support housing pivotally connected to said frame for movement between an inoperative transport position and an operative vehicle support position, and
      a wheel assembly pivotally connected to said support housing for steering movement relative thereto about a substantially vertical pivot axis when said support housing is in its vehicle support position, said wheel assembly including a wheel rotatable about an axis transverse to the axis of the connection between said wheel assembly and said support housing,
   steering means on said frame including a force and motion transmitting member and means on said wheel assembly for connection with said steering means when said support structure is in its vehicle support position, said motion transmitting member being adapted for alternative steering connection with such second vehicle module when the latter is connected to the first vehicle module.

2. The structure set forth in claim 1 and further comprising means for vertically adjusting said wheel assembly relative to said support housing when said support structure is in its vehicle support position.

3. A vehicle comprising:
   an elongated frame,
   a source of power on said frame,
   a drive axle disposed transversely of said frame and connected thereto for oscillatory movement about a longitudinal axis,
   a drive wheel mounted on each of the transversely opposite ends of said axle and connected in driven relation to said source of power,
   a pivot member on one end of said frame adapted for connection to a pivot member of a wheeled unit for pivotal steering movement about a substantially vertical pivot axis,
   power steering means including a fluid motor mounted on said frame and adapted for releasable connection to said wheeled unit, and
   a pair of auxiliary support structures adjustably mounted on said frame adjacent said one end thereof for movement between a raised transport position and a lowered ground engaging support position, one of said support structures including a support housing and a wheel assembly pivotally mounted in said housing and means on said wheel assembly for connection to said power steering means to effect steering movement of said wheel assembly.

4. The structure set forth in claim 3 wherein said other of said support structures includes a support housing and a wheel assembly pivotally mounted in said housing and adapted for connection to said power steering means.

5. The structure set forth in claim 4 wherein said support housings of auxiliary support structures are pivotally connected to said frame to permit vertical swinging movement of said structures between said raised and lowered positions.

6. The structure set forth in claim 5 and further comprising means for vertically adjusting the wheel assembly of one of said support structures relative to its associated support housing when said one support structure is in its lowered position.

7. The structure set forth in claim 6 wherein said fluid motor is an extensible and contractible fluid jack and further comprising means for limiting the stroke of said jack to less than its normal stroke when connected to said wheel assemblies.

8. A vehicle having
   a pair of two wheel modules pivotally interconnected for relative articulative steering movement about a substantially vertical pivot axis, one of said modules having a source of power connected in driving relation to the pair of wheels thereof,
   power steering means for causing articulative steering movement between said modules including a steering motor on said one module and means releasably connecting said motor to the other of said modules,
   an operator's station on said one module including a manually operable steering control member, and
   an auxiliary support structure adjustably secured to said one module for movement between raised and lowered positions including a support housing and a wheel assembly pivotally connected to said support housing for steering movement relative thereto and means on said wheel assembly for connection to said steering motor when said support structure is in its lowered position, said one module being a self-propelled steerable vehicle unit when the latter is disconnected from said other module, said support structure is in its lowered position and said steering motor is disconnected from said other module and connected to said wheel assembly.

9. The structure set forth in claim 8 wherein said support housing is pivotally connected to said one module for vertical swinging movement to effect said raised and lowered positions of said support structure.

10. The structure set forth in claim 9 and further comprising means for vertically adjusting said wheel assembly relative to said support housing when said support structure is in its lowered position.

11. The structure set forth in claim 8 wherein said power steering means includes a second steering motor on said one module releasably connected to said other module and further comprising a stationary connecting member on said one module adapted for connection to said second motor, thereby rendering the latter inoperative.

12. The structure set forth in claim 11 wherein said support housing is pivotally connected to said one module for vertical swinging movement to effect said raised and lowered positions of said support structure.

13. The structure set forth in claim 12 and further comprising means for vertically adjusting said wheel assembly relative to said support housing when said support structure is in its lowered position.

References Cited

UNITED STATES PATENTS

| | | | |
|---|---|---|---|
| 1,513,173 | 10/1924 | Hoke | 180—14 |
| 2,386,025 | 10/1945 | Wills | 94—50 |
| 2,409,181 | 10/1946 | Bagley et al. | 180—12 |
| 2,835,397 | 5/1958 | Wagner | 180—51 X |
| 2,878,731 | 3/1959 | Kressin | 94—50 |
| 2,985,080 | 5/1961 | Harrison et al. | 280—43.23 X |
| 3,130,806 | 4/1964 | Baer et al. | 180—51 X |

FOREIGN PATENTS

| | | |
|---|---|---|
| 335,090 | 7/1919 | Germany. |
| 457,792 | 12/1936 | Great Britain. |

BENJAMIN HERSH, *Primary Examiner.*

CHARLES CLINTON PARSONS, *Assistant Examiner.*